US006820060B1

(12) United States Patent
Eisner

(10) Patent No.: US 6,820,060 B1
(45) Date of Patent: Nov. 16, 2004

(54) APPARATUS FOR GENERATING SALES PROBABILITY

(76) Inventor: Jack Eisner, 363 Main St., Manalapan, NJ (US) 07726

( * ) Notice: Subject to any disclaimer, the term of this patent is extended or adjusted under 35 U.S.C. 154(b) by 937 days.

(21) Appl. No.: 08/668,737

(22) Filed: Jun. 24, 1996

(51) Int. Cl.[7] .............................................. G06F 17/60
(52) U.S. Cl. ............................................ 705/10; 705/7
(58) Field of Search ....................................... 705/10, 7

(56) References Cited

U.S. PATENT DOCUMENTS

| 5,168,445 A | * | 12/1992 | Kawashima et al. ........... | 705/10 |
| 5,361,201 A | * | 11/1994 | Jost et al. ....................... | 705/35 |
| 5,377,095 A | * | 12/1994 | Maeda et al. ................... | 705/10 |
| 5,627,973 A | * | 5/1997 | Armstrong et al. ............ | 705/10 |

FOREIGN PATENT DOCUMENTS

| JP | 05314094 A | * | 11/1993 | ............ G06F/15/20 |

OTHER PUBLICATIONS

Miller, George. "Multi–step Prospecting," Agency Sales Magazine, vo. 18, No. 5, pp. 55–58, May 1988.*
Brooks, Stephen. Introducing Maximizer Enterprise. Multi-active Sotware White Paper Series, 1995.*
"Modatech's Maximizer PIM & "Enterprise Sales" App (Modatech introduces version 3.0 of its Maximizer for Windows contact managr software and Maximizer Enterprise Opportunity Management System)." Newsbytes News Network, Feb. 14, 1995.*
"Modatech Ships Maximizer Enterprise contact Mgr. (Modatech Systems Inc. is introducing its Maximizer Enterprise Contact–management software." Newsbytes News Network, Jul. 10, 1995.*
Irsfeld, Mitch. "Client–Server Pack Integrates Sales Processes," Open Systems Today, p. 26, Sep. 27, 1993.*
Aurum Delivers First Process–driven Model for Enabling Businesses to Sell and Market More Effectively. News Release (Aurum Internet Homepage), Jun. 10, 1996.*
Aurum Software. "Sales Trak: User's Guide." Release 5.2, Version 1.0. (selected pages), Feb. 1996.*

* cited by examiner

*Primary Examiner*—Vincent Millin
*Assistant Examiner*—Kelly Campen
(74) *Attorney, Agent, or Firm*—Moser, Patterson & Sheridan, LLP; Kin-Wah Tong, Esq.

(57) ABSTRACT

A method and apparatus for predicting analytically the probability of closing a sale. The apparatus comprises a general purpose computer having a central processing unit (CPU) and a memory for generating sales probabilities. An operating system and sales probability engine are loaded from a storage medium and executed in the memory. The sales probability engine utilizes various sales information to determine the account control level corresponding to a particular stage of the sales cycle. A sales probability is then derived by applying the account control level and the current stage of the sales cycle as indices to a sales probability look-up table.

5 Claims, 7 Drawing Sheets

APPARATUS FOR GENERATING SALES PROBABILITY

The present invention relates to an apparatus and concomitant method for improving the efficiency of sales account management. More particularly, this invention relates to an apparatus and method that analytically predicts the probability of closing a sale.

BACKGROUND OF THE INVENTION

Managers of sales accounts are often challenged with the task of producing an accurate sales forecast. Unfortunately, due to the dynamics of the sales process, it is very difficult to accurately assess the probability of success of closing a sale (sales probability). Many objective and subjective factors affect the sales process, which is further complicated if the product involves complex and expensive equipment.

Some of these factors include the price of the product, the existence of competition, the advantages or disadvantages of a product when compared to its competition, the specific application of the product by the buyer, the ability to meet delivery schedule, the reputation of the product's manufacturer in the field, the availability of technical support for the product, economic conditions and various custom requirements that are dictated by the buyer, e.g., buying criteria. Although some of these factors can be measured objectively such as the price of a product, the weight assigned to each factor for a particular product, buyer or application is often unknown. For example, price may govern the success of a sale for one buyer or product, while reliability may govern the success of a sale for another buyer or product.

Furthermore, since the sales process is heavily dependent on the relationship developed between a buyer and a sales person, sales forecast is inevitably based on the subjective assessment of success as reported by each individual sales person. Thus, an optimistic sales person may report an overly optimistic forecast while a conservative sales person may report an overly pessimistic forecast. As such, a large discrepancy often appears when a sales forecast is compared with actual sales. This problem is further amplified when sales forecasts are generated at the regional, divisional and company levels, where managers of these sales accounts may not be intimately involved in the actual sales process.

Therefore, a need exists in the art for an apparatus and method for generating accurate sales forecast without the associated large margin of error. Specifically, a need exists for a method for generating accurate sales probability by applying adjustment factors to minimize the subjectivity of sales forecast.

SUMMARY OF THE INVENTION

The present invention is a method and apparatus for generating accurate sales probabilities. The apparatus, a sales probability generator, comprises a general purpose computer having a central processing unit (CPU) and a memory for generating sales probabilities. More specifically, an operating system and sales probability engine are loaded from a storage medium into the memory and executed by the CPU.

The sales probability engine utilizes various sales information to determine the account control level corresponding to a particular stage of the sales cycle. The account control level is an objective measure of the sales person's management of a sales account. More specifically, it is a measure of the sales person's ability to gain access and address the buying criteria of key members of the buyer's organization who control the buying decision.

A sales probability is then derived by applying the account control level and the current stage of the sales cycle as indices to a sales probability look-up table. In turn, the sales probability is multiplied with the total potential dollar value of the sales account to produce an objective measure, "probability dollars". This measure or parameter is used to produce an accurate sales forecast which quantifies the likelihood of success for each sales account in terms of dollar values.

The present invention may also incorporate various optional methods of refining the sales probability by applying adjustment factors which account for skill level of the sales person (years of service, training, quota attainment and the like), the pattern of stage progression of the sales cycle, maturity of the data set (sales probability look-up table), relevant economic conditions, geographical conditions, maturity of the market region, relevant government trade policies, support capabilities or use of agency.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
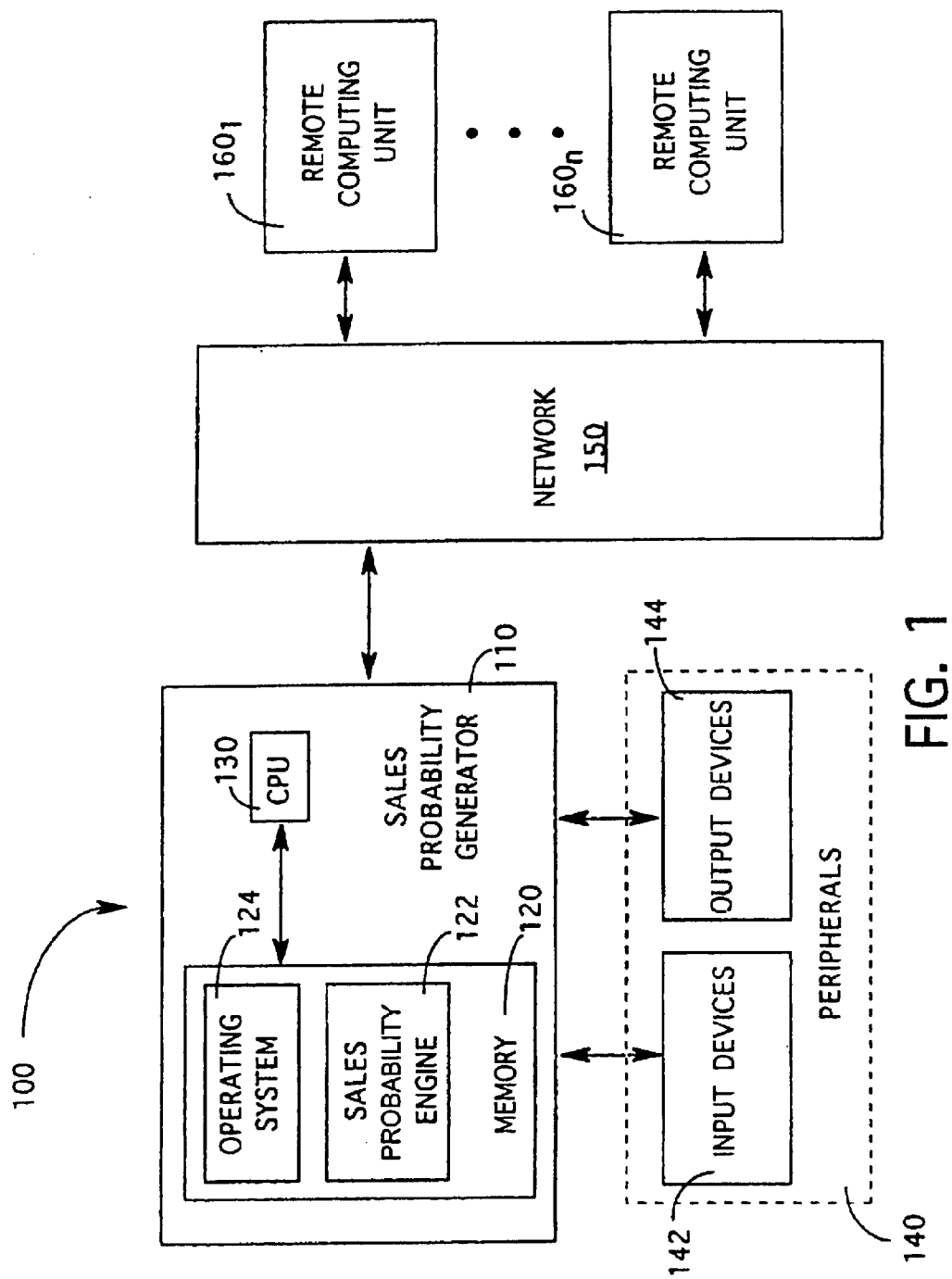
FIG. 1 illustrates a block diagram of a sales probability generator system.

FIG. 1 depicts a block diagram of a sales probability generator system 100. The sales probability generator system consists of a sales probability generator 110, a network 150, a plurality of peripherals 140 and a plurality of remote computing units $160_1$–$160_n$.

The sales probability generator 110 comprises a general purpose computer having a central processing unit (CPU) 130 and a memory 120 for generating sales probabilities. More specifically, an operating system 124 and sales probability engine 122 are loaded and executed in the memory 120 by the CPU 130. In the preferred embodiment, the sales probability engine 122 is implemented by using a spreadsheet application program such as LOTUS 1-2-3, a trademark of the Lotus Development Corporation of Cambridge, Mass. However, those skilled in the art will realize that the sales probability engine as described in FIG. 2 below can be implemented by using other commercially available spreadsheet application programs or programming languages such as Basic, Visual Basic, C, C++, Visual C or Pascal.

The sales probability generator 110 is coupled to a plurality of input and output devices 142 and 144 respectively such as a keyboard, a mouse, a modem, a video monitor, a printer or storage devices, including but not limited to a hard disk drive or a compact disk drive. The input devices serve to provide inputs to the sales probability generator for generating the sales probabilities or to retrieve the necessary data from a storage device (not shown). Typically, sales information are stored within the storage devices which are retrieved and processed by the sales probability engine to produce the sales probabilities. The sales probabilities are then stored in a storage device for subsequent use in producing a sales forecast report. Alternatively, the sales probabilities can be manipulated to produce other sales parameters such as "probability dollars" which is described below with reference to FIG. 2. In addition, the sales probabilities may serve as a parameter for triggering other sales monitoring and reporting functions, i.e., reminding a sales person to take certain actions when a predefined sales probability is reached.

The sales probability generator 110 is coupled to a network 150 which serves as an interface for parallel processing and the sharing of resources. In turn, the network is coupled to a plurality of remote computing units $160_1$–$160_n$, which may comprise general purpose computers, simple user terminals or other sales probability generators. In this manner, the sales probability generator system 100 permits the sharing of data and resources between a plurality of users, thereby improving the efficiency of managing sales accounts. For example, a traveling sales person is able to transfer sales information to the network from the field, which are then accessible by others for monitoring the progress of various sales accounts.

Generally, the probability of closing a sale corresponds closely with the sales cycle, which comprises a plurality of stages. Each stage represents a significant event or milestone in the process of sales negotiation. Table 1 illustrates a sales cycle which is generally appropriate for complex products and services such as sophisticated banking systems/services or large computer systems.

TABLE 1

Sales Cycles for Complex Product/Service

| Stages | Description |
|---|---|
| 1 | Initial Contact with the Prospect |
| 2 | Information Sent |
| 3 | Discussions |
| 4 | The Visit |
| 5 | The Demonstration |
| 6 | Request for Information/Proposal (RFI/RFP) |
| 7 | Shortlist of Vendors |
| 8 | Evaluation Phase |
| 9 | The Study |
| 10 | One Vendor Selected |
| 11 | Letter of Intent |
| 12 | Contract Negotiations |
| 13 | Agreement in Principle |
| 14 | Pending Signature |
| 15 | Contract Signing/Close the Deal |
| 16 | Lost Business (Decision not in Our Favor) |

The sales cycle starts with the first stage of "Initial Contact with the Prospect". At this stage, a sales person generally initiates the first contact with a potential buyer by making "cold" telephone calls, attending trade shows or simply receiving calls from interested buyers. If the initial contact is successful, the second stage is often achieved by forwarding introductory information such as brochures, demonstration diskettes, references or general pricing information to the buyer.

At the third stage, the sales person will enter into discussions with the buyer in order to gain some insight into the business objectives of the buyer and to determine the readiness of the buyer to close the sale (e.g., what stage of the sales cycle is the buyer at). More specifically, the sales person should attempt to make contact with key members within the buyer's organization who will likely play a significant role in affecting the buyer's decision. The key members within the buyer's organization are generalized and described below with reference to FIG. 3.

At the fourth stage, the sales person will make a brief visit to the buyer's facility to make a presentation, to answer questions or to provide a brief demonstration of the general features of the product. If the visit is successful, the sales person may return to perform a more extensive demonstration with emphasis in meeting the objectives and requirements of the buyer in the fifth stage of the sales cycle.

At the sixth stage, the buyer may issue a formal request for proposal from the sales person. At this stage, there are extensive interactions between the buyer and the sales person in preparing the proposal document. The sales person and his management will likely commit a substantial amount of resources in understanding all the needs of the buyers. The proposal will emphasize the ability of the product to meet those needs and, if necessary, any proposed modifications.

At the seventh stage, the buyer will select a shortlist of vendors having products that satisfy the basic requirements of the buyer. If the sales person's product is selected in the shortlist, the sales cycle enters the eighth stage where the buyer evaluates the product extensively. This evaluation phase may involve verifying the data in the proposal, additional demonstrations and checking references.

At the ninth stage, the buyer may conduct a study and a single vendor is selected in the tenth stage which may result in issuing a formal letter of intent in the eleventh stage. The sales cycle then proceeds to contract negotiation in the twelve stage resulting in an agreement in principle in the thirteenth stage.

At the fourteenth stage, the formal contract is reviewed and pending signatures from both parties. Finally, the sales cycle terminates at the fifteenth stage, if the parties close the deal or at the sixteenth stage, if the contract is not executed.

Those skilled in the art will realize that a sales cycle is dynamic and is not limited to the stages as described above. It is possible to have sales cycles with different stages, as well as different number of stages for different products and services. As such, Table 2 and Table 3 illustrate sales cycles which are generally appropriate for moderately complex product/service and simple product/service respectively.

TABLE 2

Sales Cycles

| Stages | Description |
|---|---|
| 1 | Initial Contact with the Prospect |
| 2 | Information Sent |
| 3 | Discussions |
| 4 | The Visit |
| 5 | The Demonstration |
| 6 | Request for Information/Proposal (RFI/RFP) |
| 7 | Evaluation Phase |
| 8 | One Vendor Selected |

TABLE 2-continued

Sales Cycles

| Stages | Description |
|---|---|
| 9 | Letter of Intent/Contract Negotiations |
| 10 | Agreement in Principle |
| 11 | Pending Signature |
| 12 | Contract Signing/Close the Deal |
| 13 | Lost Business (Decision not in Our Favor) |

TABLE 3

Sales Cycles

| Stages | Description |
|---|---|
| 1 | Initial Contact with the Prospect |
| 2 | Information Sent |
| 3 | Discussions/Visit |
| 4 | The Demonstration |
| 5 | Shortlist of Vendors |
| 6 | Evaluation of Vendors' Products |
| 7 | One Vendor Selected |
| 8 | Evaluation of Selected Vendor |
| 9 | Contract Negotiations |
| 10 | Contract Signing/Close the Deal |
| 11 | Lost Business (Decision not in Our Favor) |

Figure 2:
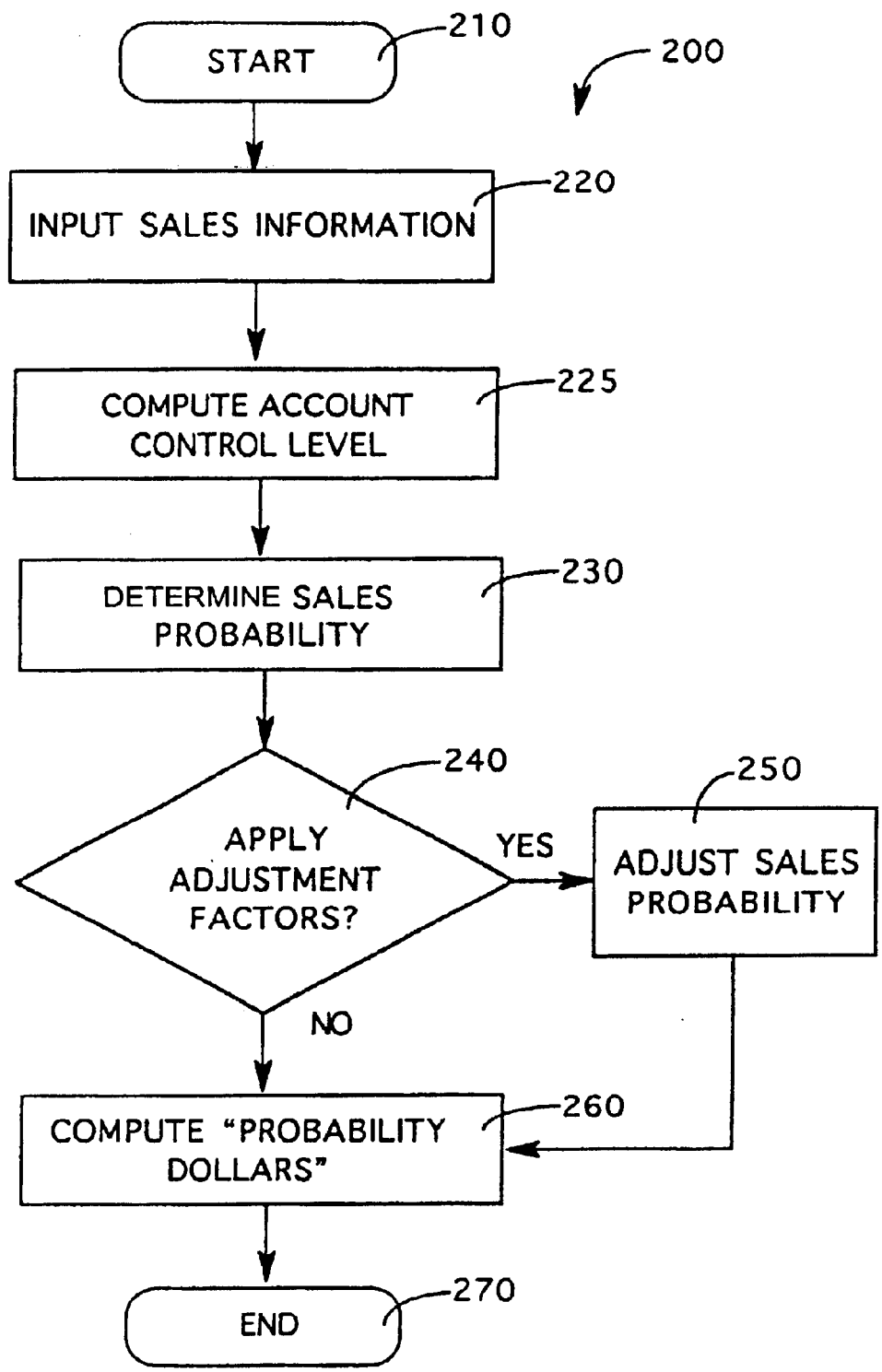
FIG. 2 illustrates a flowchart of a method for analytically predicting the probability of closing a sale.

FIG. 2 illustrates a method 200 for analytically predicting the probability of closing a sale. Referring to FIG. 2, the method 200 begins at step 210 and proceeds to step 220 where sales information are initially gathered and entered into an input file such as a spreadsheet file or a database file. The sales information may include the present stage of the sales cycle for each potential buyer, buyer specific information (i.e., names of contacts, titles, telephone numbers, milestone dates, the size of the potential sale and the like) and account control information.

In step 225, method 200 calculates the "account control level" of the sales person from the account control information provided in step 220. In the preferred embodiment, the account control information comprises a plurality of questions which are used to assess whether the sales person is deemed to have account control for a particular buyer or account. Table 4 illustrates a list of account control questions.

TABLE 4

Account Control Questions

| Number | Account Control Questions |
|---|---|
| 1 | Did the buyer indicate the significant strength of the product? |
| 2 | Did the buyer indicate the significant weakness of the product? |
| 3 | Did the buyer state its prioritized buying criteria? |
| 4 | Did the buyer reveal its internal time frame of doing business (i.e., stage of its sales cycle)? |
| 5 | Is the buyer willing to provide an assessment of the probability of closing the deal with the sales person? |
| 6 | Is the buyer willing to engage in non-business discussion (i.e., rapport building)? |
| 7 | Is the buyer willing to provide information concerning the competition (i.e., the strength and weakness of competitors' products)? |
| 8 | Is the buyer willing to provide internal attitude or position of the buyer's organization (i.e., the internal perception within the buyer's organization of the sales person's organization and its product)? |

The answers provided by the sales person to the account control questions are used by method 200 to assess the sales person's level of control over a particular sales account. A high level of account control often increases the likelihood of closing a deal. One important aspect of the present invention is the ability to quantify the subjectivity of account control into an objective factor. Thus, method 200 generates an account control level having a value ranging from 1–10 for each account based upon the answers provided by the sales person. The calculation of an account control level is discussed in detail below with reference to FIG. 3.

In step 230, method 200 computes a sales probability for each sales account. More specifically, method 200 applies the current stage of the sales cycle and the account control level to derive a sales probability by using a sales probability look-up table (Table 5).

TABLE 5

Sales Probability Table

| Sales Cycle | Account Control Level | | | | | | | | | |
|---|---|---|---|---|---|---|---|---|---|---|
| | 1 | 2 | 3 | 4 | 5 | 6 | 7 | 8 | 9 | 10 |
| 1 | .1% | 3.0% | 4.5% | 4.9% | 5.0% | 6.0% | 6.1% | 6.9% | 7.5% | 8.0% |
| 2 | 5.1% | 5.2% | 5.3% | 5.9% | 7.3% | 8.0% | 8.1% | 8.2% | 8.7% | 11.2% |
| 3 | 10.0% | 11.2% | 12.3% | 14.0% | 15.0% | 16.2% | 17.0% | 18.3% | 19.0% | 20.0% |
| 4 | 18.7% | 19.0% | 20.0% | 20.1% | 20.2% | 20.5% | 21.1% | 22.1% | 22.9% | 25.0% |
| 5 | 21.9% | 22.0% | 23.0% | 25.0% | 27.0% | 31.5% | 32.0% | 33.5% | 34.0% | 35.0% |
| 6 | 26.1% | 27.0% | 28.5% | 34.0% | 37.5% | 40.0% | 43.0% | 46.0% | 47.0% | 49.0% |
| 7 | 35.0% | 36.7% | 38.0% | 41.6% | 42.1% | 43.2% | 46.5% | 47.5% | 49.0% | 50.9% |
| 8 | 39.2% | 40.0% | 44.5% | 47.6% | 51.3% | 52.1% | 54.0% | 56.0% | 57.0% | 59.0% |
| 9 | 41.2% | 42.0% | 46.0% | 49.0% | 55.0% | 58.9% | 60.0% | 65.0% | 70.0% | 75.0% |
| 10 | 65.0% | 66.0% | 67.0% | 68.0% | 69.0% | 69.5% | 72.5% | 73.0% | 74.9% | 80.0% |
| 11 | 67.5% | 69.1% | 70.2% | 71.1% | 75.1% | 80.2% | 81.5% | 83.0% | 83.6% | 84.9% |
| 12 | 75.0% | 77.3% | 78.5% | 79.9% | 80.0% | 82.3% | 86.5% | 88.0% | 89.0% | 90.0% |
| 13 | 79.0% | 79.9% | 82.0% | 84.0% | 86.0% | 87.0% | 89.0% | 92.0% | 93.9% | 94.8% |
| 14 | 82.7% | 85.0% | 87.5% | 89.0% | 90.0% | 93.5% | 96.5% | 97.0% | 97.5% | 98.0% |

TABLE 5-continued

Sales Probability Table

| Sales Cycle | Account Control Level | | | | | | | | | |
|---|---|---|---|---|---|---|---|---|---|---|
| | 1 | 2 | 3 | 4 | 5 | 6 | 7 | 8 | 9 | 10 |
| 15 | 100% | 100% | 100% | 100% | 100% | 100% | 100% | 100% | 100% | 100% |
| 16 | 0% | 0% | 0% | 0% | 0% | 0% | 0% | 0% | 0% | 0% |

The x-axis (horizontal axis) represents the account control level with a range from level 1 to level 10. The y-axis (vertical axis) represents the stages of a sales cycle for a complex product as illustrated in Table 1. Method 200 uses the stage of the sales cycle and the account control level as indices to point to a sales probability in Table 5. The sales probability represents the likelihood of closing the deal for a sales account at a particular stage of the sales cycle. Thus, there is a 73% chance in closing a deal if the account is at stage 10 with an account control level of 8. In addition, each sales probability in Table 5 carries a tolerance of 5% (e.g., a sales probability of 50% has a tolerance of (0.05×50%) ±2.5%).

Although the preferred embodiment of the present invention utilizes a sales probability table, those skilled in the art will realize that the information on the sales probability table can be organized in different formats. For example, the information can be plotted to produce a line graph (linear or non-linear). In turn, an equation can be derived to represent the line curve.

In step 240, method 200 determines whether adjustment factors should be applied to the sales probability. Depending on the products or services, various optional adjustment factors can be applied to refine the sales probability. These adjustment factors are calculated from various input data which are selectively provided to the sales probability engine. The adjustment factors may account for skill level of the sales person (years of service, training, quota attainment and the like), the pattern of stage progression of the sales cycle, maturity of the data set (sales probability look-up table), relevant economic conditions, geographical conditions, state of the technology, maturity of the market region, relevant government trade policies, support capabilities and/or use of agency. Those skilled in the art will realize that the calculated sales probability can be adjusted to account for other conditions.

Figure 5:
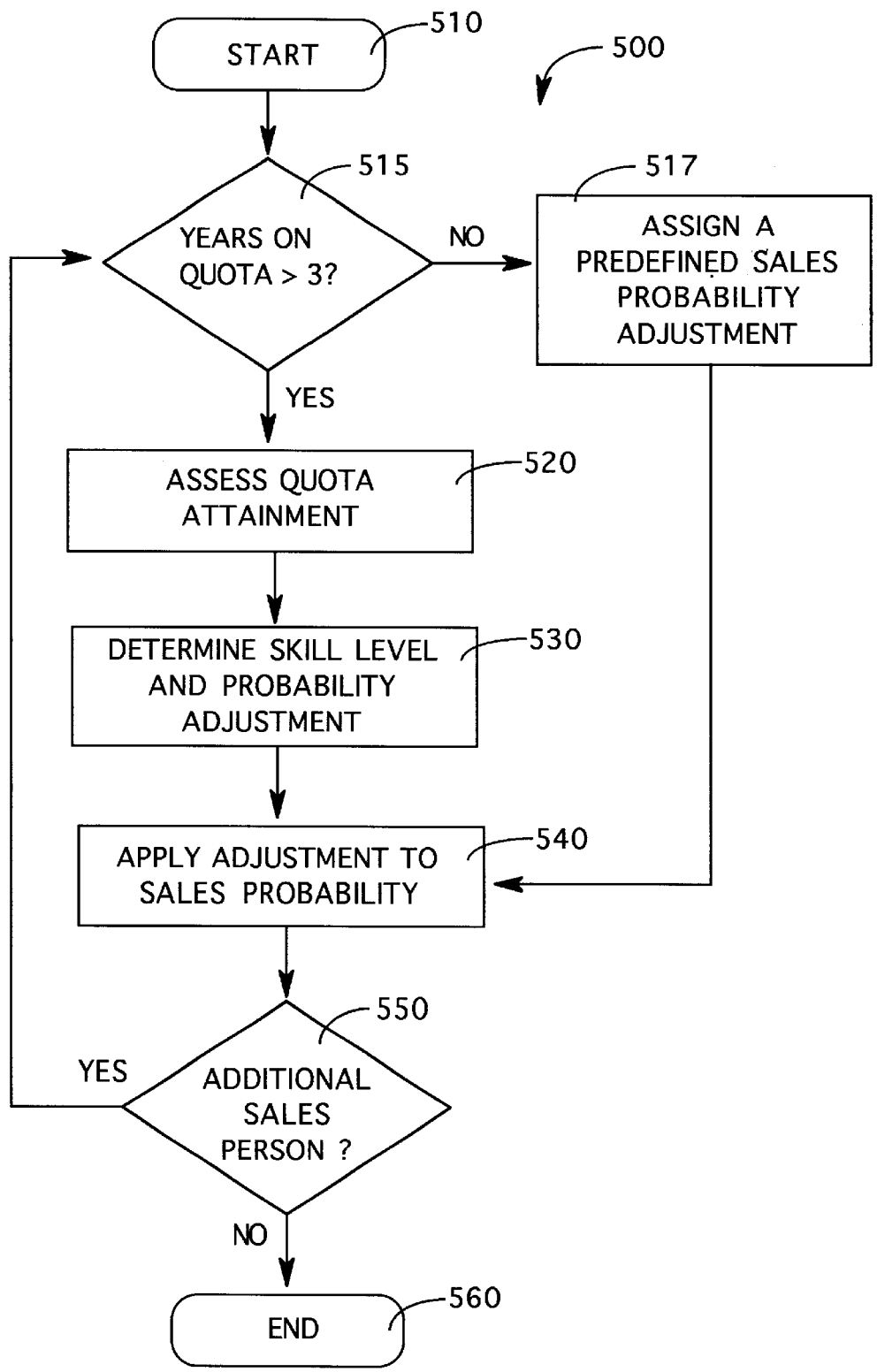
FIG. 5 illustrates a flowchart of a method for adjusting the sales probability in accordance with the skill level of a sales person.
Figure 6:
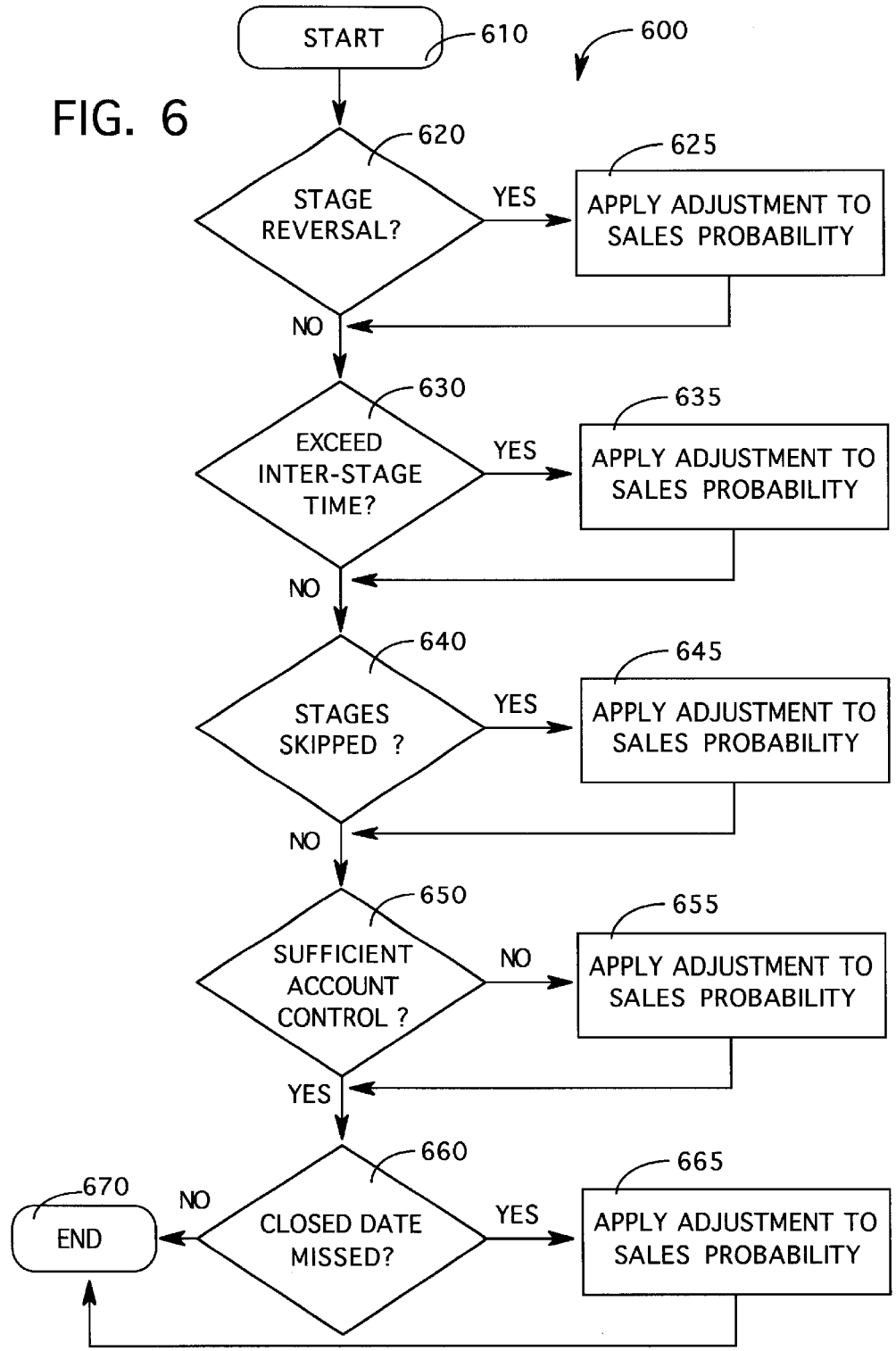
FIG. 6 illustrates a flowchart of a method for adjusting the sales probability in accordance with the various patterns of the stage progression of a sales cycle.
Figure 7:
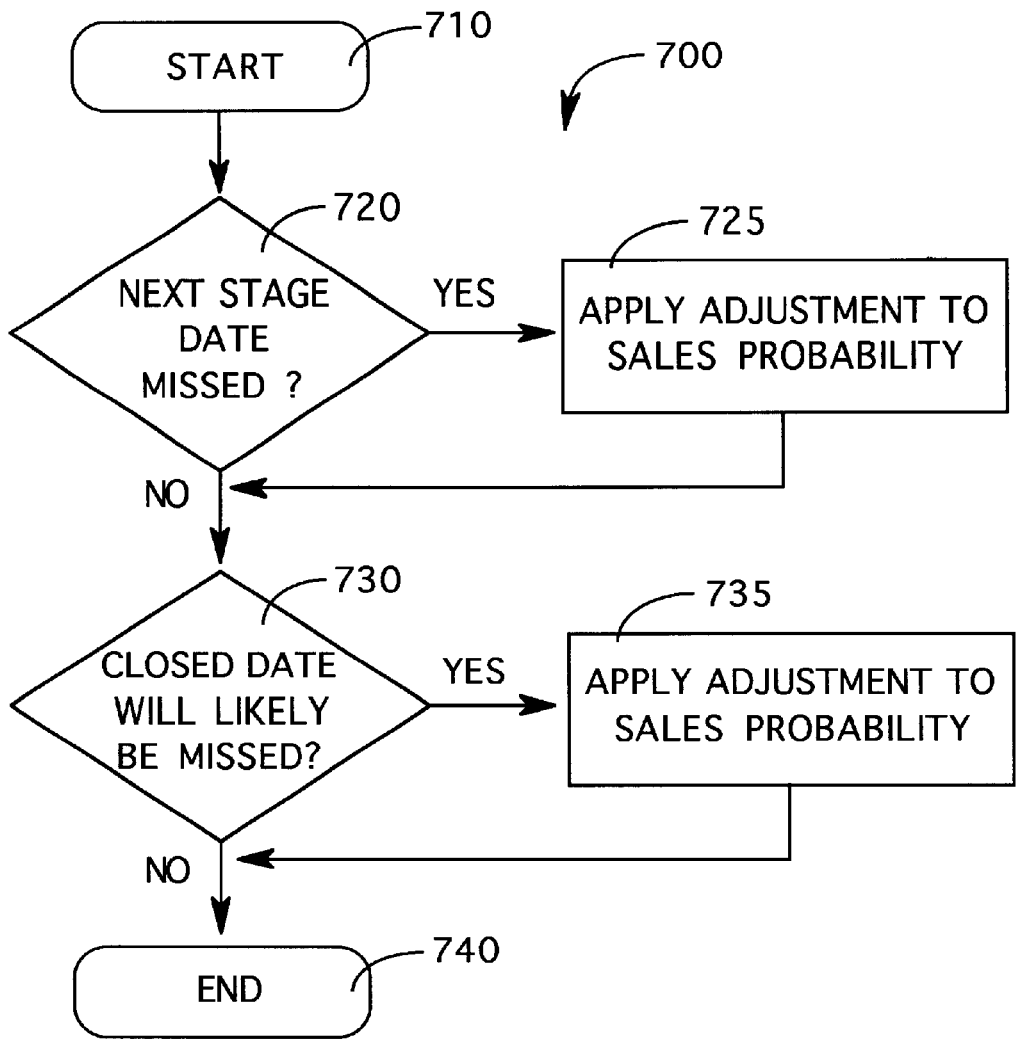
FIG. 7 illustrates a flowchart of a method for adjusting the sales probability in accordance with other patterns of the stage progression of a sales cycle.

If the query is affirmatively answered in step 240, then method 200 proceeds to step 250 where the relevant adjustment factors are applied to refine the sales probability. FIGS. 5–7 illustrate flowcharts of several adjustment factors that are discussed below. If the decision is negatively answered, method 200 proceeds to step 260 where the parameter, "probability dollars", is computed.

In step 260, the probability dollars parameter is calculated for each account by multiplying the sales probability with the total potential dollar value of the account. Namely, if the sales probability is 50% for an account with a potential value of $1,000,000 in services and/or products, then the probability dollars value is $500,000 for the account. The probability dollars parameter is used to produce an accurate sales forecast which quantifies the likelihood of success for each sales account in terms of dollar values. Once the probability dollars parameter is calculated, method 200 ends in step 270.

Figure 3:
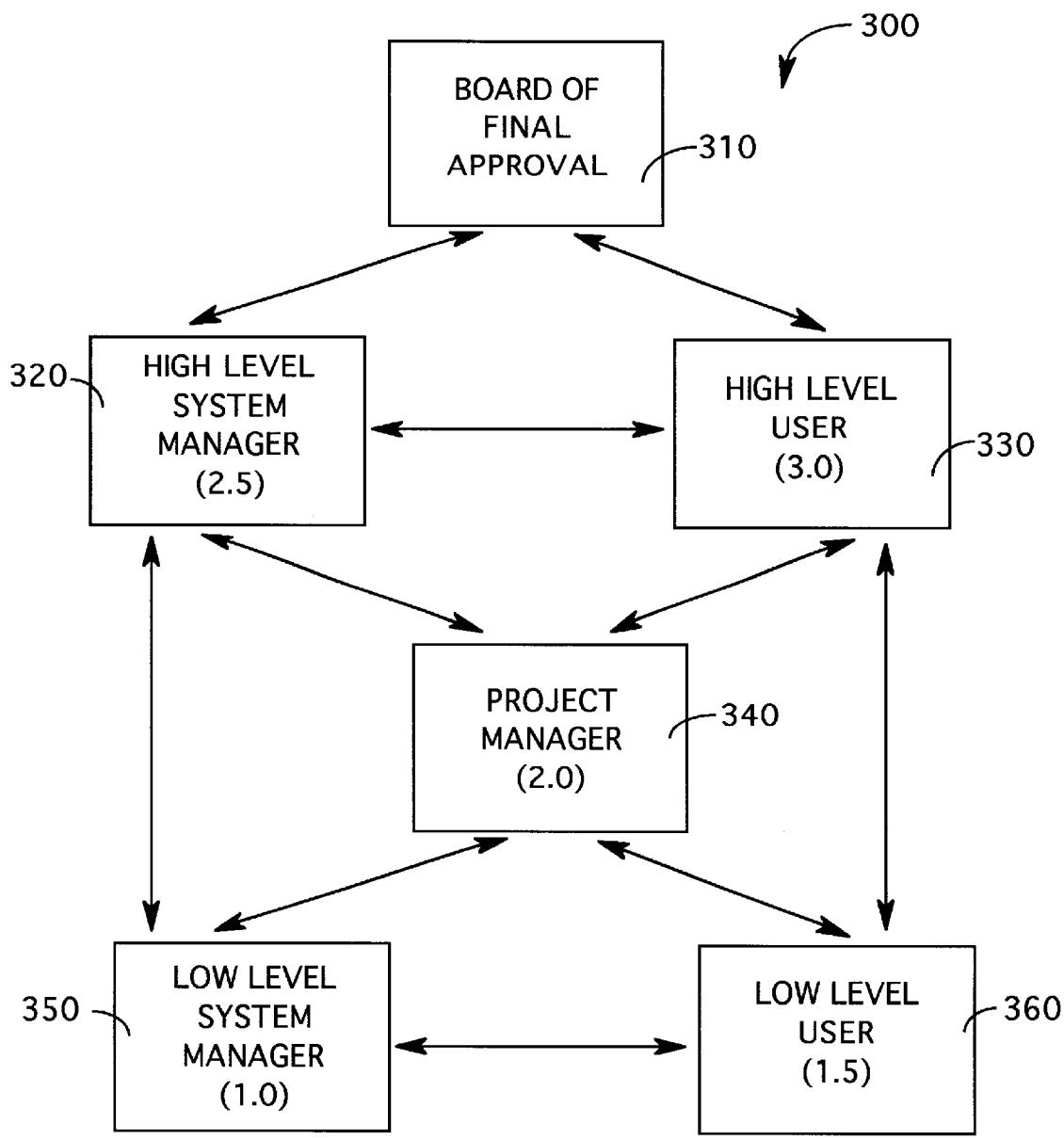
FIG. 3 illustrates a block diagram of the organizational dynamics of a buyer in deciding buying decisions.

FIG. 3 illustrates a block diagram of the organizational dynamics 300 of a buyer's organization in deciding buying decisions. More specifically, FIG. 3 illustrates potential key members or classes of participants in the buyer's organization who may play a significant role in affecting the buying decision. A key aspect in closing a deal is the ability to understand and address the buying criteria of each member.

Generally, a decision making body or board of final approval 310 receives inputs directly or indirectly from a group of individuals such as a high level system manager 320, a high level user 330, a project manager 340, a low level system manager 350 and a low level user 360. For the purpose of illustration, if the product for sale is a complex computer system for a bank, the low level user 360 may include a bank teller, a clerk or a branch supervisor. The buying criteria of a low level user may focus on ease of use or implementation of the product, functional requirements for local processing, product acceptance features such as time saving features, friendly user interface, display enhancements, report generation capabilities, support documentation and technical support such as on-line help (local support). The low level user generally reports to a high level user 330.

The high level user is typically the department head of a group of low level users who actually use the equipment. The buying criteria of the high level user may focus on the long term effect of the purchase such as centralized processing, increased profitability, geographic uniformity, the need to retrain the current staff of low level users, training cost, effect on the efficiency of the low level users, ease of use, compatibility with current equipment, portability of data set and technical support for users.

The low level system manager 350 is typically a computer system supervisor who maintains and monitors the local computer system. As such, low level system manager generally interacts closely with the low level users by providing technical support and training. The buying criteria of a low level system manager may focus on ease of installation of the equipment (ease of implementation), system integration, diagnostic features such as trouble shooting functions or utilities, time saving features, friendly user interface, ease of upgrade, reliability and maintainability of the equipment, format compatibility with current equipment and technical support. The low level system manager generally reports to a high level system manager 320.

The high level system manager is often the department head in charge of maintaining and operating all the computer systems of the bank. The buying criteria of the high level system manager may focus on the long term effect of the purchase such as the serviceable life of the equipment, cost of maintaining the equipment, required skill level of the supervisors of the equipment, the ability of the equipment to meet future needs and strategies, consolidation of data, cost reduction, investment protection, flexible interfacing and integration and the overall cost to his department.

Finally, a project manger 340 is often assigned the task of managing the entire program, e.g., a project manager in charge of modernizing the automatic teller machine system (ATM) of a bank. The buying criteria of a project manager is often a collection of requirements gathered from the buying criteria from the other four classes of individuals. However, additional buying criteria may include meeting budget constraint, completing the project on schedule, coordinating the current purchase with other services and products, maintaining consistency throughout the sales cycle, preference for innovative and proven product and responsiveness, reliability and experience of the vendor.

In order for a sales person to achieve a high level of account control, he must gain access to these key members in the buyer's organization and, more importantly, he must assess the buying criteria of each member. The present invention assigns an account control value to each key member or class as illustrated in FIG. 3. The account control values are 2.5 for the high level system manager, 3.0 for the high level user, 2.0 for the project manager, 1.0 for the low level system manager and 1.5 for the low level user. These account control values are used to derive an overall account control level for the sales account in step 225 of FIG. 2.

A sales person is awarded the account control value assigned to each member of the buyer's organization, if he is able acquire an adequate response to the account control questions listed in Table 4. Adequate responses to four (4) out of the eight (8) questions will be sufficient to award the account control value to the sale person. However, questions 1–3 of Table 4 must be among the four answered questions before the account control value is awarded.

To illustrate, if the sales person is able to obtain the project manager's assessment of the product, i.e., the strength and weakness of the sales person's product, the prioritized buying criteria of the buyer and internal information concerning probability of success and sales cycle, then the sales person is awarded the account control value 2.0 assigned to the project manager. This award reflects the sales person's success in assessing the buying criteria of the project manager, thereby achieving account control as applied to the project manager.

In contrast, if the sales person is only able to engage in some non-business discussion and to obtain some internal information concerning sales probability, stage of the sales cycle and reputation of the sales person's organization, then the sales person is not awarded the account control value. This action reflects the sales person's lack of success in assessing the buying criteria of the project manager. Without a good understanding of the buying criteria of each of the key members of the buyer's organization, it would be extremely difficult to address the needs and concerns of the buyer, thereby decreasing the likelihood of closing the deal.

The present invention applies the account control questions of Table 4 to all the key members of FIG. 3 to obtain an overall account control level for the sales account. Thus, if a sales person is able to gain access to all the key members and is deemed to have adequately assessed the buying criteria of all the members, then the maximum account control level of 10 is assigned to the sales account.

Similarly, if the sales person is only able to gain access to the low level user and the low level system manager, then the highest possible account control level that can be assigned to the sales account is 2.5. This low account control level indicates the sales person's inability to assess the buying criteria of other key members who are able to affect the buying decision.

Although FIG. 3 illustrates the typical organizational dynamics of a buyer, it can be tailored to accommodate other organizational structures. For example, if the sales person is able to determine that a project manager is not present in the buyer's organization, then the account control value assigned to the project manager is divided among the four remaining members or classes of the buyer's organization. However, the account control value should be divided such that the relative ratios of the account control values between the remaining members are maintained. Thus, without the project manager, the account control values are 3.125 for the high level system manager, 3.75 for the high level user, 1.25 for the low level system manager and 1.875 for the low level user. In this manner, the present invention can be adjusted to provide accurate sales probability to other organizational structures.

Similarly, another illustrative organizational structure may comprises an assistant of international/marketing (low level user), the head of international/marketing (high level user), an assistant of systems/information technology (low level system manager), the head of systems/information technology (high level system manager), and a project manager.

Figure 4:
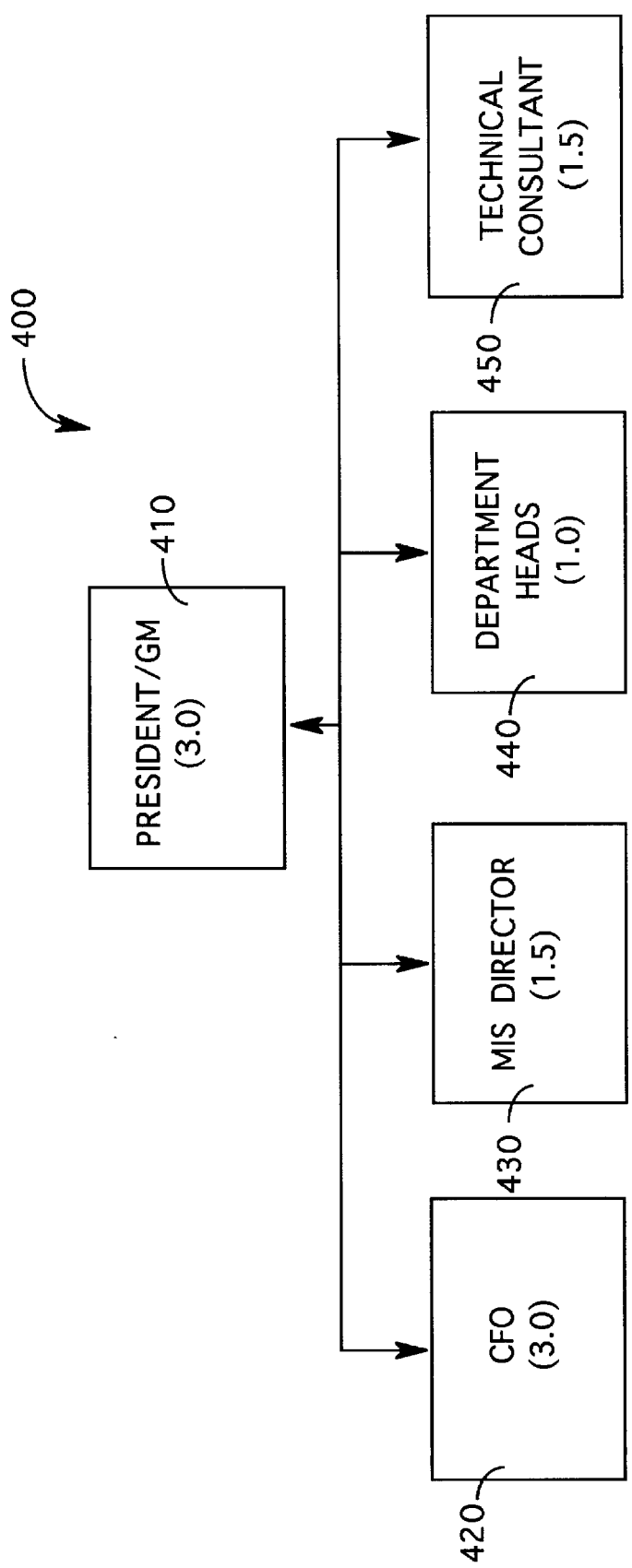
FIG. 4 illustrates a block diagram of a second organizational dynamics of a buyer in deciding buying decisions.

FIG. 4 illustrates a block diagram of another organizational dynamics 400 of a buyer's organization in deciding buying decisions. More specifically, FIG. 4 illustrates the key members or classes of participants in the buyer's organization as a president/general manager (GM) 410, a chief financial officer (CFO) 420, a management information system (MIS) director 430, a group of department heads 440 with veto power on the buying decision and a technical consultant 450.

In this organizational structure, the key members are able to receive inputs directly or indirectly with each other. This organizational structure reflects a buying decision for a product/service that will have broad impact to the buyer's organization, e.g., hiring a new advertising agency or licensing a new line of technology (new processes, new formats or new software). As such, the key members are high level managers or officers of the buyer's organization. Again, in order for a sales person to achieve a high level of account control, he must assess the buying criteria of each member.

The buying criteria of the president 410 may focus on the long term impact of the product on the direction of the buyer's organization, e.g., growth of the organization, defining the market for its products and services and maintaining the competitive edge and image of the organization. Similarly, the buying criteria of the CFO 420 may focus on the same objectives, but with emphasis to the financial implications.

The MIS director 430 may focus on the product's impact on the general state of technology within the buyer's organization, while various department heads 440 who hold veto power to the buying decision may focus on the product's impact to their own departments. Finally, a special technical consultant with specific expertise in the field of the product may be employed to provide technical inputs to the other key members. The technical consultant may focus on the technical aspects of the product, e.g., state of the technology, ease of implementation, reliability and maintainability of the product, general consumer acceptance of the technology and the availability of alternate technology.

Similarly, the present invention assigns an account control value to each key member or class as illustrated in FIG. 4. The account control values are 3.0 for the president/GM, 3.0 for the CFO, 1.5 for the MIS director, 1.0 for the group of department heads with veto power and 1.5 for the technical consultant. These account control values are used to derive an overall account control level for the sales account in step 225 of FIG. 2.

Once the account control level is determined, the present invention applies the account control level and the current stage of the sales cycle as indices to derive a sales probability. If the account control level is not an integer, the present invention will round the level to the nearest integer.

FIG. 5 illustrates a flowchart of a method 500 for adjusting the sales probability in accordance with the skill level of a sales person. Referring to FIG. 5, the method 500 begins at step 510 and proceeds to step 515 where method 500 determines whether the sales person has more than three years of service with a quota requirement. If the query is negatively answered, method 500 proceeds to step 517 where a predefined adjustment of −10% is applied to the calculated sales probability. For example, the sales probability of 50% for an account belonging to a sales person with less than three years of service with a quota, would be adjusted to 40% to account for the skill level of the sales person.

If the query is affirmatively answered in step 515, then method 500 proceeds to step 520 where the quota attainment of the sales person is assessed for the last three consecutive years. The average quota attainment is used to determine the skill level of the sales person in step 530.

In step 530, method 500 determines the skill level of the sales person and the associated sales probability adjustment in accordance with Table 6.

TABLE 6

Skill Level Adjustment Table

| Average Quota Attainment (last 3 years) | Skill Level | Probability Adjustment |
| --- | --- | --- |
| more than 15% below annual quota | 1 | −5% |
| 11–15% below the annual quota | 2 | −4% |
| 6–10% below the annual quota | 3 | −3% |
| 3–5% below the annual quota | 4 | −2% |
| Meet the annual quota within 3% | 5 | −1% |
| 3–5% above the annual quota | 6 | +1% |
| 6–10% above the annual quota | 7 | +2% |
| 11–15% above the annual quota | 8 | +3% |
| 15–20% above the annual quota | 9 | +4% |
| 20% above the annual quota | 10 | +5% |

In step 540, the product of the probability adjustment based on skill level and the calculated sales probability is added to the calculated sales probability. To illustrate, a calculated sales probability of 50% would be adjusted to 51% for an account belonging to a sales person with more than three years of service and having an average quota attainment of 10% above the annual quota, i.e., 50%+(2%× 50%)=51%.

In step 550, method 500 determines whether the sales account is managed by a single sales person or by a sales team. For large sales accounts, a sales team can more efficiently address the various needs of a potential buyer. As such, the calculated sales probability should be adjusted to account for the skill levels of all the members of the sales team. If the query is positively answered, method 500 returns to step 515 and the skill level of the next member is used to adjust the calculated sale probability until all members of the sales team are accounted. If the query is negatively answered, method 500 ends in step 560.

FIG. 6 illustrates a flowchart of a method 600 for adjusting the sales probability in accordance with the various patterns of the stage progression of the sales cycles. Although the determination of the current stage of the sales cycle plays an important role in assessing a sales probability, the information or pattern in which each stage is achieved is used to refine the calculated sales probability.

Referring to FIG. 6, the method 600 begins at step 610 and proceeds to step 620 where method 600 determines whether the sales cycle is reverting to an earlier stage of the sales cycle, i.e., the likelihood of closing the sales account is decreasing instead of increasing. If the query is negatively answered, method 600 proceeds to step 630. If the query is affirmatively answered in step 620, then method 600 proceeds to step 625 where the calculated sales probability is adjusted by a factor of 0.98. For example, a sales probability of 50% is adjusted to 49% (0.98×50%) to account for the regression in the stages of the sales cycle, e.g., going from stage 8 to stage 6.

In step 630, method 600 determines whether the predefined inter-stage time limits between successive stages are exceeded. Namely, a predefined number of days are set in which the next stage of the sales cycle should be achieved to maintain a high probability of success. The predefined maximum inter-stage time limits between successive stages of the sales cycle are provided in Table 7.

TABLE 7

Stage Progression Table

| Stage (From) | Stage (To) | Average Inter-Stage Time Limit (in days) | Maximum Inter-Stage Time Limit (in days) | Account Control Level |
| --- | --- | --- | --- | --- |
| 1 | 2 | 6 | 8 | 1 |
| 2 | 3 | 6 | 8 | 2 |
| 3 | 4 | 6 | 8 | 3 |
| 4 | 5 | 12 | 15 | 4 |
| 5 | 6 | 12 | 15 | 4 |
| 6 | 7 | 6 | 8 | 5 |
| 7 | 8 | 12 | 15 | 5 |
| 8 | 9 | 12 | 15 | 6 |
| 9 | 10 | 12 | 15 | 6 |
| 10 | 11 | 6 | 8 | 7 |
| 11 | 12 | 6 | 8 | 7 |
| 12 | 13 | 12 | 15 | 8 |
| 13 | 14 | 6 | 8 | 8 |
| 14 | 15 | 12 | 15 | 10 |

If the query is negatively answered, method 600 proceeds to step 640. If the query is affirmatively answered in step 630, then method 600 proceeds to step 635 where the calculated sales probability is adjusted by a factor of 0.993. For example, a sales probability of 50% is adjusted to 49.65% (0.993×50%) to account for the delay in achieving the next stage in the sales cycle, e.g., taking more than 15 days to progress from stage 7 to stage 8.

In step 640, method 600 determines whether any stage is skipped or bypassed. Namely, if the sales cycle for a sales account is progressing rapidly, then there is an increased likelihood of closing the sales account. If the query is negatively answered, method 600 proceeds to step 650. If the query is affirmatively answered in step 640, then method 600 proceeds to step 645 where the calculated sales probability is adjusted by a factor of 1.019. For example, a sales probability of 50% is adjusted to 50.95% (1.019×50%) to account for the rapid progression in achieving a stage in the sales cycle, e.g., progressing from stage 7 to stage 9 directly.

In step 650, method 600 determines whether there is sufficient account control at the current stage of the sales cycle. Namely, a minimum account control level should be achieved for a particular stage of the sales cycle so as to maintain a high probability of success. The minimum account levels for the various stages of the sales cycle are also provided in Table 7 (using the first column from the left labeled "Stage (From)" as indicating the current stage of the sales cycle).

If the query is affirmatively answered, method 600 proceeds to step 660. If the query is negatively answered in step 640, then method 600 proceeds to step 655 where the calculated sales probability is adjusted by a factor of 0.9811. For example, a sales probability of 50% is adjusted to 49.055% (0.9811×50%) to account for the lack of account control for the current stage of the sales cycle, e.g., having only an account control level of 7 at stage 12 of the sales cycle.

In step 660, method 600 determines whether the contract signing date is missed. If the query is negatively answered, method 600 ends in step 670. If the query is affirmatively answered in step 660, then method 600 proceeds to step 665 where the calculated sales probability is adjusted by a factor of 0.989. For example, a sales probability of 50% is adjusted to 49.45% (0.989×50%) to account for the delay in signing the contract to close the sales account. Method 600 then ends in step 670.

FIG. 7 illustrates a flowchart of a method 700 for adjusting the sales probability in accordance with additional patterns of the stage progression of a sales cycle. Referring to FIG. 7, the method 700 begins at step 710 and proceeds to step 720 where method 700 determines whether the projected date for achieving the next stage of the sales cycle is missed. Generally, a projected date for achieving the next stage between successive stages is a time period that is shorter than the predefined maximum inter-stage time limit. The projected date for achieving each stage can be selectively set by the sales person or the sales manager.

If the query is negatively answered in step 720, method 700 proceeds to step 730. If the query is affirmatively answered in step 720, then method 700 proceeds to step 725 where the calculated sales probability is adjusted by a factor of 0.989. For example, a sales probability of 50% is adjusted to 49.45% (0.989×50%) to account for missing the projected date of achieving the next stage, e.g., requiring 14 days to reach stage 10 from stage 9 when the projected average date is set at twelve (12) days to achieve stage 10.

In step 730, method 700 determines whether there is a likelihood of missing a projected contract signing date. An average projected contract signing date is initially projected by a sales person or sales manager for a sales account, e.g., a contract should be signed within 126 days from an initial contact with a potential buyer. The likelihood of missing an average projected contract signing date is calculated by taken the difference of the projected contract signing date and the date of achieving the last stage in the sales cycle. The result of the difference is the remaining number of days ("projected remaining days") till the projected contract signing date. In turn, this number is compared with a sum of all the remaining average inter-stage time limits from the current stage to the contract signing stage ("average remaining days"). If the "projected remaining days" is less than the "average remaining days" then the calculated probability is adjusted by a factor to reflect the increased risk.

If the query is negatively answered in step 730, method 700 ends in step 740. If the query is affirmatively answered in step 730, then method 700 proceeds to step 735 where the calculated sales probability is adjusted by a factor of 0.982. For example, referring to Table 7, a sales probability of 80% is adjusted to 78.56% (0.982×80%) if 110 days have elapsed and the sales account is at stage 12, i.e., projected remaining days (16 days) is less than the average remaining days (30 days).

Those skilled in the art will realize that the "Average Inter-stage Time Limit", the "Maximum Inter-Stage Time Limit", the "Account Control Level" in Table 7 and the various adjustment factors illustrated in methods 600 and 700 can be modified to accommodate different sales cycles and/or products and services. Furthermore, the various sales probability adjustments can be optionally implemented or omitted as required for a specific application.

There has thus been shown and described a novel method and apparatus for predicting analytically the probability of closing a sale. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. An apparatus for predicting a sales probability for a sales account at a stage within a sales cycle, comprising:
   means for determining a current stage of the sales cycle for the sales account;
   means for calculating an account control level for the sales account; and
   means for correlating a sales probability based upon said current stage of the sales cycle and said calculated account control level.

2. The apparatus of claim 1, wherein said correlating means comprises a sales probability table.

3. The method of claim 2, wherein said probability table is expressed as:

| Sales Cycle | Account Control Level | | | | | | | | | |
|---|---|---|---|---|---|---|---|---|---|---|
| | 1 | 2 | 3 | 4 | 5 | 6 | 7 | 8 | 9 | 10 |
| 1 | .1% | 3.0% | 4.5% | 4.9% | 5.0% | 6.0% | 6.1% | 6.9% | 7.5% | 8.0% |
| 2 | 5.1% | 5.2% | 5.3% | 5.9% | 7.3% | 8.0% | 8.1% | 8.2% | 8.7% | 11.2% |
| 3 | 10.0% | 11.2% | 12.3% | 14.0% | 15.0% | 16.2% | 17.0% | 18.3% | 19.0% | 20.0% |
| 4 | 18.7% | 19.0% | 20.0% | 20.1% | 20.2% | 20.5% | 21.1% | 22.1% | 22.9% | 25.0% |
| 5 | 21.9% | 22.0% | 23.0% | 25.0% | 27.0% | 31.5% | 32.0% | 33.5% | 34.0% | 35.0% |
| 6 | 26.1% | 27.0% | 28.5% | 34.0% | 37.5% | 40.0% | 43.0% | 46.0% | 47.0% | 49.0% |
| 7 | 35.0% | 36.7% | 38.0% | 41.6% | 42.1% | 43.2% | 46.5% | 47.5% | 49.0% | 50.9% |
| 8 | 39.2% | 40.0% | 44.5% | 47.6% | 51.3% | 52.1% | 54.0% | 56.0% | 57.0% | 59.0% |
| 9 | 41.2% | 42.0% | 46.0% | 49.0% | 55.0% | 58.9% | 60.0% | 65.0% | 70.0% | 75.0% |
| 10 | 65.0% | 66.0% | 67.0% | 68.0% | 69.0% | 69.5% | 72.5% | 73.0% | 74.9% | 80.0% |

-continued

| Sales Cycle | Account Control Level | | | | | | | | | |
|---|---|---|---|---|---|---|---|---|---|---|
| | 1 | 2 | 3 | 4 | 5 | 6 | 7 | 8 | 9 | 10 |
| 11 | 67.5% | 69.1% | 70.2% | 71.1% | 75.1% | 80.2% | 81.5% | 83.0% | 83.6% | 84.9% |
| 12 | 75.0% | 77.3% | 78.5% | 79.9% | 80.0% | 82.3% | 86.5% | 88.0% | 89.0% | 90.0% |
| 13 | 79.0% | 79.9% | 82.0% | 84.0% | 86.0% | 87.0% | 89.0% | 92.0% | 93.9% | 94.8% |
| 14 | 82.7% | 85.0% | 87.5% | 89.0% | 90.0% | 93.5% | 96.5% | 97.0% | 97.5% | 98.0% |
| 15 | 100% | 100% | 100% | 100% | 100% | 100% | 100% | 100% | 100% | 100% |
| 16 | 0% | 0% | 0% | 0% | 0% | 0% | 0% | 0% | 0% | 0% |

4. The apparatus of claim 1, wherein said account control level calculating means assesses a sales person's account control for a key member within a buyer's organization and determines whether an account control value assigned to said key member should be awarded to the sales account.

5. The apparatus of claim 1, further comprising a means for refining said sales probability with an adjustment factor.

* * * * *